United States Patent [19]

Rice

[11] Patent Number: 4,813,322

[45] Date of Patent: Mar. 21, 1989

[54] SCROLL SAW MOUNT FOR MULTI-PURPOSE TOOL

[76] Inventor: Verle L. Rice, 700 S. Halsey, Harrisonville, Mo. 64701

[21] Appl. No.: 53,806

[22] Filed: May 26, 1987

[51] Int. Cl.⁴ ........................ B27B 19/06; B23D 49/00
[52] U.S. Cl. ........................................ 83/748; 83/783
[58] Field of Search ................... 89/748, 781, 1, 784, 89/615, 628, 581.1, 477.2

[56] References Cited

U.S. PATENT DOCUMENTS

| | | | |
|---|---|---|---|
| 1,908,563 | 5/1933 | Slabaugh et al. | 83/615 |
| 2,970,484 | 2/1961 | Springer | 83/615 |
| 3,017,779 | 1/1962 | Beals | 83/615 |
| 4,503,742 | 3/1985 | Sutton | 83/781 |
| 4,566,510 | 1/1986 | Bartlett et al. | 83/477.2 |
| 4,625,609 | 12/1986 | Ashworth | 83/615 |
| 4,646,605 | 3/1987 | Rice et al. | 83/782 |

Primary Examiner—Frank T. Yost
Assistant Examiner—Hien H. Phan
Attorney, Agent, or Firm—Kokjer, Kircher, Bradkely, Qharton, Bowman & Johnson

[57] ABSTRACT

A novel mounting assembly for use with a universal woodworking tool support system is the subject of the invention. First and second straight elongated support stanchions are received by tubular members of the universal tool support system. A scroll saw is mounted on top of these two straight stanchions. A drive train includes an eccentric drive for reciprocating the scroll saw arms and a concentric mass between the eccentric drive and the output of the prime mover is part of the universal tool support system. The concentric mass together with the straight support stanchions greatly reduces the vibrations which are transmitted through the drive train to the scroll saw framework.

1 Claim, 1 Drawing Sheet

SCROLL SAW MOUNT FOR MULTI-PURPOSE TOOL

This invention relates generally to woodworking equipment and more particularly to a mounting assembly for use in adapting a precision scroll saw to a multi-purpose woodworking tool.

Multi-purpose woodworking tools are popular and consist of a basic framework support system and a prime mover to which various attachments can be connected. A tool of this type is shown and described in U.S. Pat. No. 4,566,510, issued Jan. 28, 1986. The patented tool is widely sold and known under the trademark SHOPSMITH. This patent is expressly incorporated into the present specification by reference.

Precision type saws, sometimes referred to as jig saws and more properly known as scroll saws, are also widely used by woodworkers. A typical parallel arm scroll saw is shown and described in U.S. Pat. No. 4,503,742.

While various types of woodworking tools including some types of saws have been used with the multi-purpose woodworking tools of the type disclosed in the referenced patent, precision scroll saws have not heretofore been adapted to be used with these multi-purpose tools. The primary reason for this is that scroll saws require careful balancing and minimal vibration in order to perform their precision cutting function satisfactorily. The relatively large framework and motor of the multi-purpose tools result in a relatively high level of vibration which is transmitted to some degree to the woodworking implements attached to the multi-purpose tool. This results in unsatisfactory performance if a conventional mount is utilized.

The present invention has as its primary object the provision of a mount for a universal type of woodworking tool so that a precision scroll saw may be mounted on the tool.

An important one of the objectives of my invention is to provide a mount for a universal type of woodworking tool as described in the foregoing object wherein the mount is designed to greatly reduce the amount of vibration transmitted from the universal tool framework to the precision scroll saw.

Another one of the objectives of my invention is to provide a mount of the type described which reduces the amount of vibration transmitted from the universal tool to the scroll saw by utilizing straight support stanchions and a concentric weight on the drive transmission assembly.

Another one of the objects of this invention is to provide a scroll saw mount for a universal type woodworking tool as described in the foregoing objects which is relatively inexpensive to manufacture because of the straight support arms as opposed to offset arms of the prior art.

Other objects of the invention will be made clear or become apparent from the following description and claims when read in light of the accompanying drawing, wherein:

Figure 1:
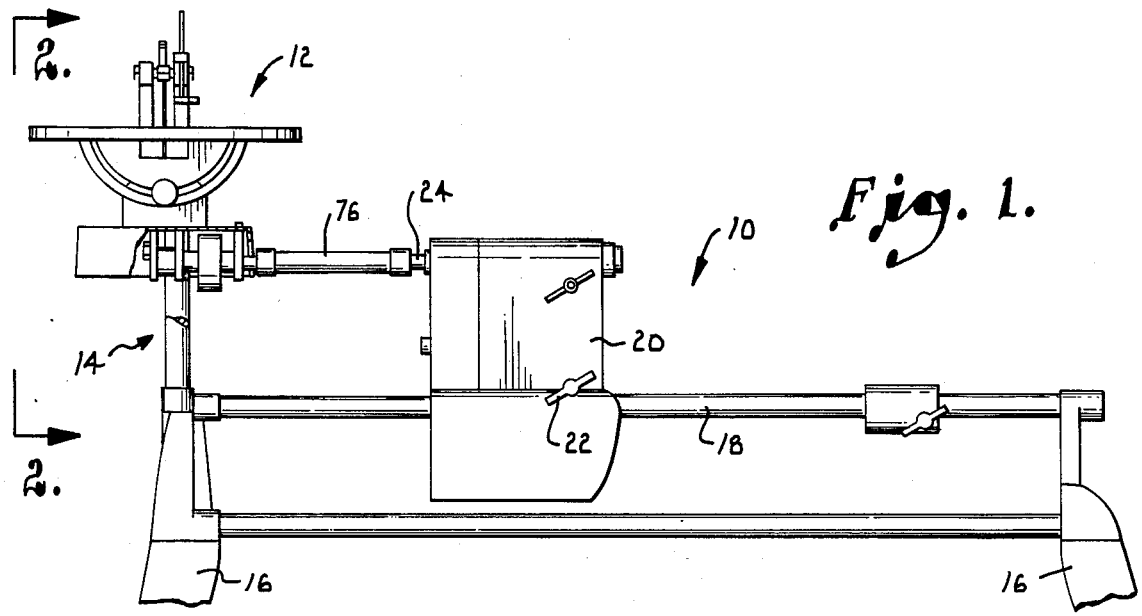
FIG. 1 is a fragmentary side elevational view of a universal woodworking, tool with the scroll saw mount shown attached thereto.
Figure 2:
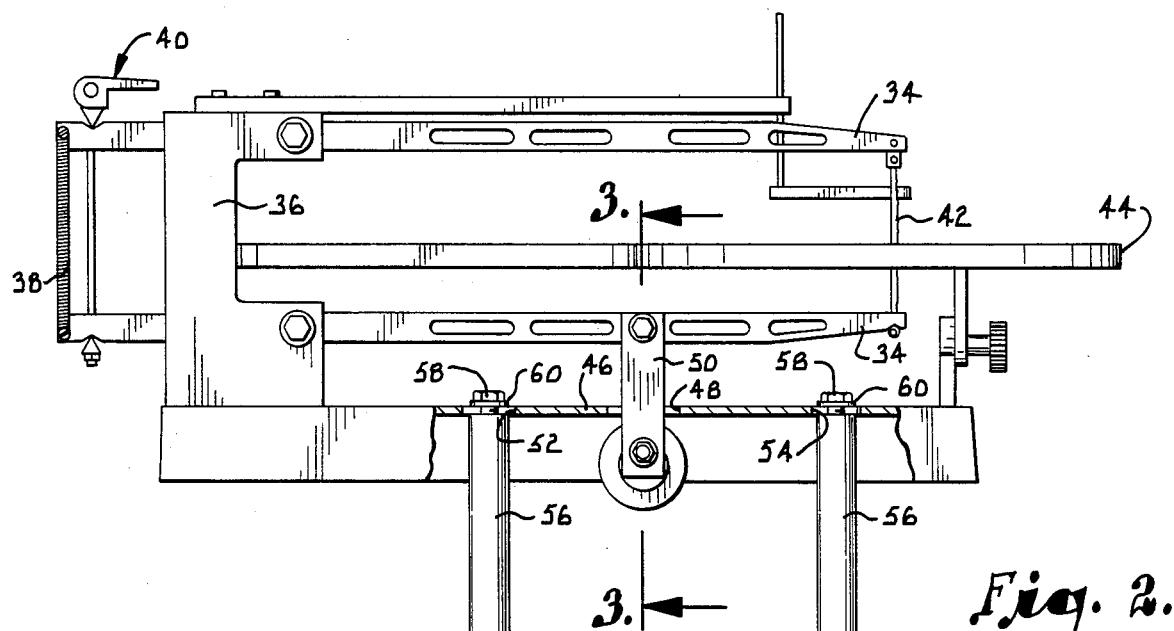
FIG. 2 is an elevational view looking in the direction of arrows 2—2 of FIG. 1.

Referring initially to FIG. 1, a universal woodworking tool support system is designated generally by the numeral 10. This system is shown and described in greater detail in the referenced patent. A parallel arm or scroll saw is designated generally by the numeral 12 and the support system of the present invention is designated generally by the numeral 14.

The universal tool support system 10 includes four depending legs 16 (two of which are visible in FIG. 1) and elongated parallel support bars 18 which are mounted on legs 16, one of the bars being visible in FIG. 1. A prime mover in the form of an electric motor 20 is mounted on support bars 18 and is transversly movable over the length of the bars. The motor 20 can be locked in position by turning handle 22. Motor 20 has an output shaft 24 for driving various implements which are mounted on the support system 10. At one end of the support system 10 is an implement mounting bracket 26 which includes tubular sockets 28 and tensioning screws 30 which are both turned by handle 32 threadably coupled with the screws. All of the aforedescribed apparatus is well known in the art as evidenced by the referenced patent.

Referring now to details of scroll saw 12, the scroll saw comprises parallel arms 34 which are mounted on C-bracket 36 and held in proper tension by retaining mechanism 40. A saw blade 42 is held by arms 34 at the end of the arms opposite spring 38. A tiltable table 44 presents a work surface for holding a piece of flat wood to be sawed.

Scroll saw 12 includes a flat support plate 46 which provides a base for C-bracket 36 and the other supporting members of the scroll saw 12. A first slot 48 in plate 46 accommodates a drive arm 50 which is coupled with lower parallel arm 34 and extends downwardly through the slot. Second and third slots 52 and 54 in plate 46 are disposed on either side of slot 48.

First and second straight elongated support stanchions 56 are received in sockets 28 and extend generally perpendicular to the floor on which system 10 stands. Stanchions 56 are threaded on one end and receive retaining bolts 58 which, along with washers 60, hold support plate 46 in place on the stanchions.

Figure 3:
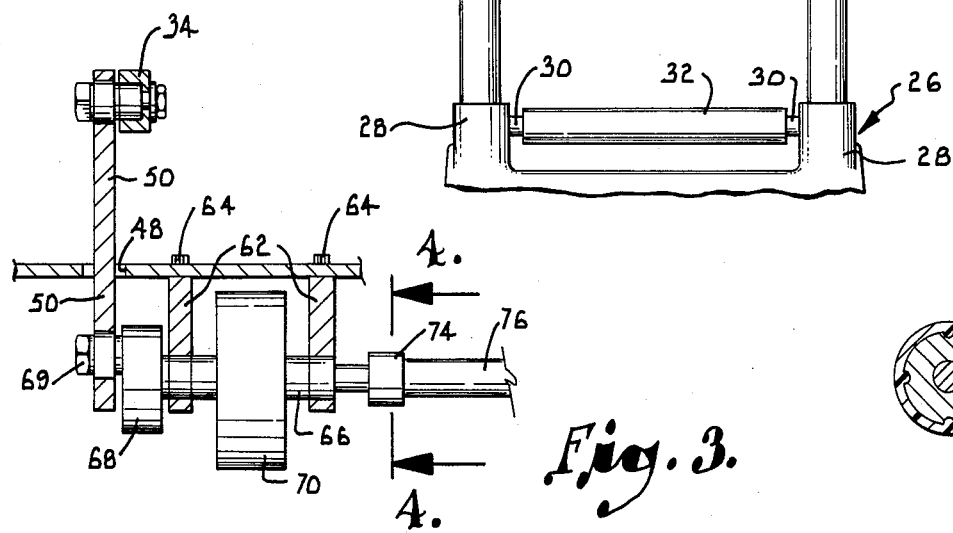
FIG. 3 is a vertical cross-sectional view taken along line 3—3 of FIG. 2.
Figure 4:
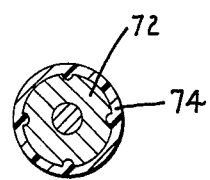
FIG. 4 is another vertical cross-sectional view taken along line 4—4 of FIG. 3.

Referring now to FIG. 3, depending brackets 62 extend downwardly from support plate 46 and are held rigid therewith by screws 64. Brackets 62 mount a shaft 66 which has an eccentric 68 mounted thereon. Drive arm 50 is, in turn, coupled with eccentric 68 by bolt 69. Also mounted on shaft 66 is a relatively large concentric circular weight 70. Weight 70 has a diameter at least 4 times the diameter of shaft 68. The end of shaft 66 terminates in a fluted member 72 which drivingly receives a splined sleeve 74 that is integral with an arm 76 which serves as an extension of output shaft 24 by being in integral driving relationship with the latter.

When saw 12 is to be used for cutting wood stock, stanchions 56 are placed in sockets 28 and moved to an appropriate vertical height where they are locked in position by turning handle 32. Saw 12 is then mounted on the stanchions by aligning slots 52 and 54 with the threaded holes in the ends of the stanchions so as to permit bolts 58 to secure the plate 46. A limited degree of lateral movement of the saw on the stanchions is permitted by slots 52 and 54.

The motor 20 is then moved an appropriate distance from the fluted end member 72 so as to permit arm 76 to be coupled with the member and with the end of output shaft 24. It should be understood that arm 76 may be fitted over the output shaft 24 and a biasing spring permits the arm to be moved back in the direction of the output shaft so that the sleeve 74 can be placed over end member 72. The spring then holds the arm in driving engagement with the end member. When the motor is actuated, shaft 66 will turn eccentric drive 68 which effects a reciprocating generally vertical motion of arm 50 to move the saw blade 42.

While eccentric counter balances have been used in conjunction with scroll saw drives heretofore, such as that shown in U.S. Pat. No. 4,503,742, these counter balances have been intended to partially offset the forces of the eccentric drive mechanism. It has not heretofore been known, to the knowledge of the present Applicant, to utilize a concentric mass in the drive train to absorb vibrational forces. The eccentric counter balance of the prior art drive mechanism is not particularly effective in absorbing vibrations since these can actually be magnified and enhanced by the eccentric counter balance. This, of course, is not a problem with the drive mechanisms of the prior art which are specifically designed for use with scroll saws and are sized accordingly.

With the relatively large drive motor 20, however, which is not specifically designed for scroll saws and is mounted on the relatively large framework comprised of legs 16 and bars 18, vibrations are a problem if a scroll saw is to be used as one of the woodworking implements in conjunction with the tool support system 10. The use of the large concentric mass 70 greatly reduces the transmission of vibrations through the drive mechanism to the saw blade. Also, the utilization of perfectly straight support stanchions 56 further reduces vibrating forces transmitted through the saw in comparison with the prior art stanchions. Heretofore, the prior art devices have utilized stanchions which are not straight but are intentionally constructed from two radially offset cylindrical members so that turning of such a stanchion will result in movement of the threaded aperture at the end of the stanchion for the purpose of aligning the woodworking implement with the output shaft 24 of the motor 20. These intentionally nonstraight stanchions result in a moment being created around the two offset radii which can actually increase the magnitude of vibrations transmitted through the drive mechanism. This problem is overcome utilizing the perfectly straight stanchions 56 and by providing slots 52 and 54 in plate 46 so as to accommodate limited movement of the plate for the purpose of aligning the output shaft from the motor with the drive coupling shaft 68 for the saw.

I claim:

1. In a woodworking tool comprising a prime mover mounted on a framework and being adapted to be positioned at different locations along said framework, said prime mover having an output shaft for driving woodworking implements, said framework having means for receiving and holding implement support stanchions, the improvement comprising:

first and second elongated straight support stanchions received and held rigidly by said receiving and holding means;

a flat support adapted to be held by said stanchions said support presenting elongated slots;

means extending through said slots for holding said flat support on said support stanchion while accommodating limited movement of said flat support relative to said stanchions;

a parallel arm saw mounted on said flat support and adapted to mount a blade between said parallel arms;

a drive arm extending downwardly from the lowermost parallel arm;

an eccentric drive shaft coupled with said drive arm for moving the latter along a rectilinear path in response to rotation of said drive shaft;

a coupling shaft joined with said drive shaft and adapted to be joined with said output shaft;

said coupling shaft having a concentric weight thereon for absorbing vibrations from said output shaft when the latter is joined to said coupling shaft and said prime move is in operation, said concentric weight being circular in one dimension and having a diameter at least four times the diameter of said coupling shaft.

* * * * *